(12) United States Patent
Shimbaru et al.

(10) Patent No.: US 8,730,254 B2
(45) Date of Patent: May 20, 2014

(54) APPARATUS AND METHOD FOR PERFORMING COLOR CONVERSION BASED ON VIEWING CONDITIONS

(75) Inventors: Susumu Shimbaru, Yokohama (JP); Yoshitaka Sasaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 619 days.

(21) Appl. No.: 12/125,793

(22) Filed: May 22, 2008

(65) Prior Publication Data

US 2008/0297529 A1    Dec. 4, 2008

(30) Foreign Application Priority Data

May 28, 2007  (JP) ................................. 2007-140558
May 28, 2007  (JP) ................................. 2007-140559

(51) Int. Cl.
*G09G 5/02*  (2006.01)

(52) U.S. Cl.
USPC ........................................................ 345/589

(58) Field of Classification Search
USPC ........................................................ 345/589
See application file for complete search history.

(56) References Cited

U.S. PATENT DOCUMENTS

| | | | | |
|---|---|---|---|---|
| 6,075,888 A | * | 6/2000 | Schwartz | 382/167 |
| 6,118,455 A | * | 9/2000 | Hidaka et al. | 345/589 |
| 6,459,436 B1 | * | 10/2002 | Kumada et al. | 345/590 |
| 6,847,374 B2 | | 1/2005 | Matsuda | |
| 2003/0052868 A1 | * | 3/2003 | Kagawa et al. | 345/204 |
| 2007/0076226 A1 | * | 4/2007 | Klompenhouwer et al. | 358/1.1 |

FOREIGN PATENT DOCUMENTS

| | | |
|---|---|---|
| JP | 2000-050086 A | 2/2000 |
| JP | 2002-209117 A | 7/2002 |
| JP | 2005-142769 A | 6/2005 |
| WO | 99/023637 A1 | 5/1999 |

OTHER PUBLICATIONS

Japanese Office Action for Application No. 2007-140559 dated Nov. 15, 2011.
Japanese Office Action for corresponding Japanese Application No. 2007-140559, dated May 29, 2012.
Japanese Office Action for Application No. 2007-140558 dated Jan. 10, 2012.

* cited by examiner

*Primary Examiner* — Edward Martello
(74) *Attorney, Agent, or Firm* — Carter, DeLuca, Farrell & Schmidt LLP

(57) ABSTRACT

A color processing apparatus includes a device characteristic acquisition unit configured to acquire a monitor device characteristic, a viewing condition acquisition unit configured to acquire a viewing condition of a display screen, a correction unit configured to correct the monitor device characteristic based on the viewing condition of the display screen, and a color conversion unit configured to perform color conversion based on the viewing condition of the display screen and the corrected monitor device characteristic.

8 Claims, 20 Drawing Sheets

FIG. 9

```
APPEARANCE PARAMETER
WP  112 120 133
L_A  24
c    0.59
Nc   0.9
F    0.9
Yb   41

PRIVATE DATA
 :      :

COLORIMETRIC VALUE DATA
R G B   X Y Z
0 0 0   2 3 2
0 0 16  4 5 7
  :      :
```

FIG. 13

| | |
|---|---|
| LUT GRATING STRUCTURE DATA | R VALUE STEPS: 0,32,64,...,224,255 |
| | G VALUE STEPS: 0,32,64,...,224,255 |
| | B VALUE STEPS: 0,32,64,...,224,255 |

LUT GRATING POINT DATA

GRID (0,0,0,) Jab COORDINATES: (30,0,-2)
GRID (0,0,1,) Jab COORDINATES: (31,2,-9)
⋮
GRID (0,0,8,) Jab COORDINATES: (34,18,-33)
GRID (0,1,0,) Jab COORDINATES: (34,-8,0)
⋮
GRID (8,8,7,) Jab COORDINATES: (90,4,12)
GRID (8,8,8,) Jab COORDINATES: (92,0,0)

APPARATUS AND METHOD FOR PERFORMING COLOR CONVERSION BASED ON VIEWING CONDITIONS

BACKGROUND OF THE INVENTION

1. Field of the Invention

The present invention relates to a color processing apparatus and method for performing color conversion according to a viewing condition.

2. Description of the Related Art

In recent years, devices which handle color images have become more widely used. In conjunction with this, a common workflow is to perform the design and layout of images digitalized by a digital camera or a scanner on a monitor for output using a printer. This workflow is widely carried out in fields such as desktop publishing (DTP), computer graphics (CG) and computer-aided design (CAD). During such processing, the range of colors which can be reproduced (hereinafter, referred to as "color gamut") differs for each device handling an image. Therefore, there is a need to perform color conversion processing for making up the difference in color gamuts among devices in order to match the colors of the image in each step.

A color matching system (CMS) is employed for the color conversion processing which matches colors among different devices. As illustrated in FIG. 18, a CMS is formed from a device profile that lists the characteristics and viewing conditions of the devices to be matched and a color matching module (CMM) for performing the matching processing of the colors among those devices. The CMS, first, converts input device-dependent color signal values (RGB, CMYK etc.) to device-independent color signal values (CIELAB, CIECAM02 etc.) During the conversion, the viewing condition (appearance parameter) listed in the device profile is used. Examples of parameters for conversion into CIELAB color space include white tristimulus values, and examples of parameters for conversion into CIECAM02 color space include white tristimulus values, luminance of the adapting field, background luminance and surroundings. Next, color matching is carried out by performing color conversion processing (gamut mapping) to make up the difference in color gamuts among different devices in this device-independent color space.

Generally, to achieve high-accuracy color matching, the characteristics of the devices to be matched have to be measured by a chromometer so that a device profile can be generated which stores the resulting device characteristic data. However, chromometers are expensive, and it takes time to carry out the measurement. Thus, an sRGB profile which is standardized for typical monitor devices and a profile provided by the respective vendors are used.

A typical monitor profile, such as an sRGB profile for instance, assumes that the monitor is under dark conditions. Further, even when measuring a device characteristic of a monitor with a usual chromometer, the measurement is carried out by attaching the chromometer close to the screen to block out external light. Therefore, no consideration is given to the effect of external light reflection on the monitor screen which occurs under a normal monitor viewing condition, for the device characteristic listed in the device profile of such a monitor. FIG. 19 illustrates an example of external light 1901 reflection on a monitor screen 1902. Here, letting the tristimulus values of the emitted light component 1903 of the monitor 1902 be XYZm, and the tristimulus values of the reflected component 1904 on the monitor 1902 be XYZr, the tristimulus values XYZ 1905 which actually enter an observer's eye 1906 can be found according to the following equation.

$$XYZ = XYZm + XYZr$$

Specifically, a person observing the monitor perceives a color different to XYZm, which is the characteristic intrinsic to the device. Since the tristimulus values of this reflected component are constant irrespective of the emitted light component, the larger the difference perceived by an observer is, the smaller the XYZm values for a color are. FIG. 20 illustrates the shape of a monitor color gamut when no consideration is given to the reflected component on the monitor screen. For conventional color matching such as that illustrated in FIG. 20, the difference is especially large in dark sections of the image, and matching accuracy deteriorates.

Accordingly, for conventional monitor and printer color matching, no consideration is given to the effect of external light reflection which occurs according to the viewing condition with a monitor used in color matching. Therefore, there has been the problem that matching accuracy deteriorates.

Further, a technique for correcting the characteristic of a device displaying an image according to the viewing condition has been proposed (U.S. Pat. No. 6,847,374).

Although the method discussed in U.S. Pat. No. 6,847,374 improves the appearance of an image displayed on a display device, it lacks any consideration of color matching with an output image from a printer or the like.

Further, consideration can be given to external light at the point of measuring the monitor device characteristic by using data measured by a non-contact chromometer to generate a profile. However, not only is the measurement difficult, but the versatility of the profile deteriorates because the viewing condition on the monitor is limited.

SUMMARY OF THE INVENTION

According to an aspect of the present invention, a color processing apparatus includes a device characteristic acquisition unit configured to acquire a monitor device characteristic, a viewing condition acquisition unit configured to acquire a viewing condition of a display screen, a correction unit configured to correct the monitor device characteristic based on the viewing condition of the display screen, and a color conversion unit configured to perform color conversion based on the viewing condition of the display screen and the corrected monitor device characteristic.

According to another aspect of the present invention, a color processing apparatus includes a profile acquisition unit configured to acquire a monitor profile and a printer profile, an illumination light acquisition unit configured to acquire illumination light information in the printer profile, a correction unit configured to correct a monitor calorimetric value stored in the monitor profile using the illumination light information, and a color conversion processing unit configured to perform color conversion processing using the corrected monitor calorimetric value and the printer profile.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a diagram illustrating the data structure of a device profile.

FIG. 13 is a diagram illustrating the data structure of the color correction look-up table (LUT) according to an exemplary embodiment of the present invention.

DETAILED DESCRIPTION OF THE EMBODIMENTS

Various exemplary embodiments, features, and aspects of the invention will be described in detail below with reference to the drawings.

An exemplary embodiment of the present invention describes an image processing apparatus which performs color matching processing of an image displayed on a monitor and an image output by a printer. In the first exemplary embodiment, the input image is an image according to sRGB, and sRGB characteristics are used for the monitor device characteristic.

In the case of the present exemplary embodiment, since the image output by the printer is viewed at the same location as the display image of the monitor, the viewing condition of the monitor and the viewing condition of the printer are the same.

Figure 1:
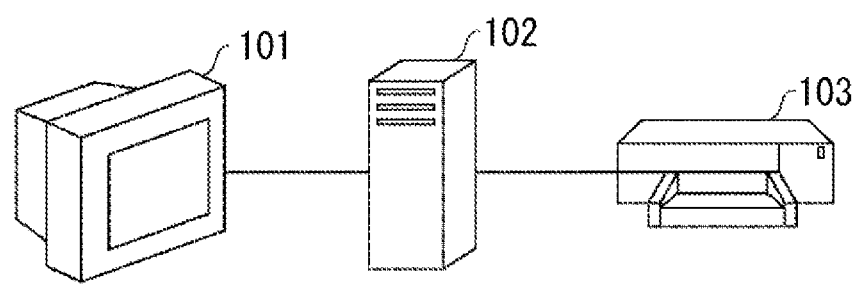
FIG. 1 is a block diagram illustrating the outline of the image processing apparatus according to an exemplary embodiment of the present invention.

An exemplary configuration of the image processing apparatus is illustrated in FIG. 1.

A monitor 101 displays an image corresponding to an image or an image processing application. A personal computer (PC) 102 executes display, output and color matching processing. A printer 103 outputs an image.

Figure 2:
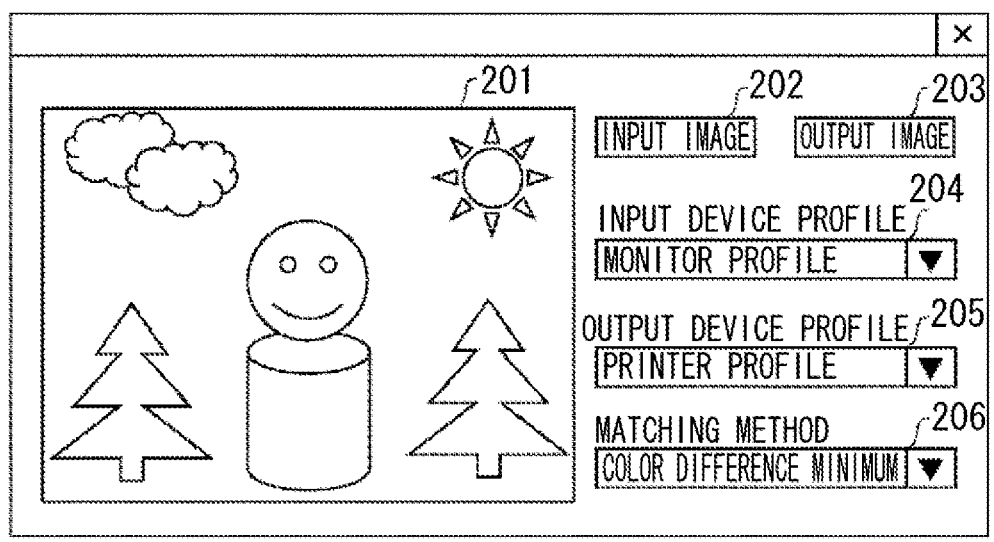
FIG. 2 is a diagram illustrating the user interface of the image processing apparatus according to an exemplary embodiment of the present invention.

An example of the user interface for instructing the display of an image, color matching processing and output to the printer will now be described with reference to FIG. 2.

Image display region 201 is for displaying an image which is displayed on the monitor 101. Image input button 202 is for instructing the input of the image. The image may be input by a desired method, such as from a hard disk drive (HDD) in the PC 102, an external device like a digital still camera (DSC) connected to the PC 102, and a local area network (LAN). The input image is displayed on the image display region 201. An image output button 203 is for sending an instruction for the printer 103 to output an image which has undergone the desired image processing. An input device profile designation region 204 is for designating the profile in which the device characteristic of the input device and the viewing condition are stored. An output device profile designation region 205 is for designating the output device profile in which the device characteristic of the output device and the viewing condition are stored. A matching method designation region 206 is for designating the conversion method when converting the color signal value of the input device to the color signal value of the output device.

The configuration of the image processing apparatus of the present exemplary embodiment realized in the PC 102 will now be described with reference to the block diagram of FIG. 3.

A device characteristic acquisition unit 301 acquires the device characteristic from the device profiles designated at the input device profile designation region 204 and the output device profile designation region 205. A viewing condition acquisition unit 302 acquires the viewing condition from the device profiles designated at the input device profile designation region 204 and the output device profile designation region 205. A device characteristic correction unit 303 corrects the device characteristic acquired by the device characteristic acquisition unit 301 based on the viewing condition acquired by the viewing condition acquisition unit 302. An image input unit 304 acquires the image displayed on the image display region 201. An image conversion unit 305 converts the image input from the image input unit 304 based on the device characteristic corrected by the device characteristic correction unit 303 and the mapping method designated at the matching method designation region 206. An image output unit 306 sends the image converted by the image conversion unit 305 to a printer.

Figure 3:
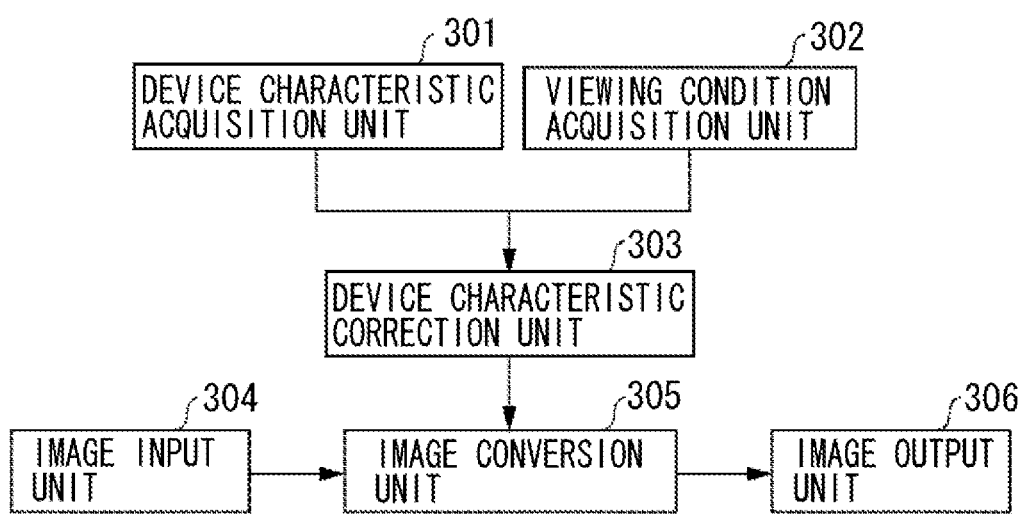
FIG. 3 is a block diagram illustrating the configuration of the image processing apparatus according to an exemplary embodiment of the present invention.

Although the image processing apparatus according to the present exemplary embodiment has a configuration like that illustrated in FIG. 3, the function of each of the units 301 to 305 may be executed by a central processing unit (CPU) in the PC 102 based on a program stored in a recording medium.

Figure 4:
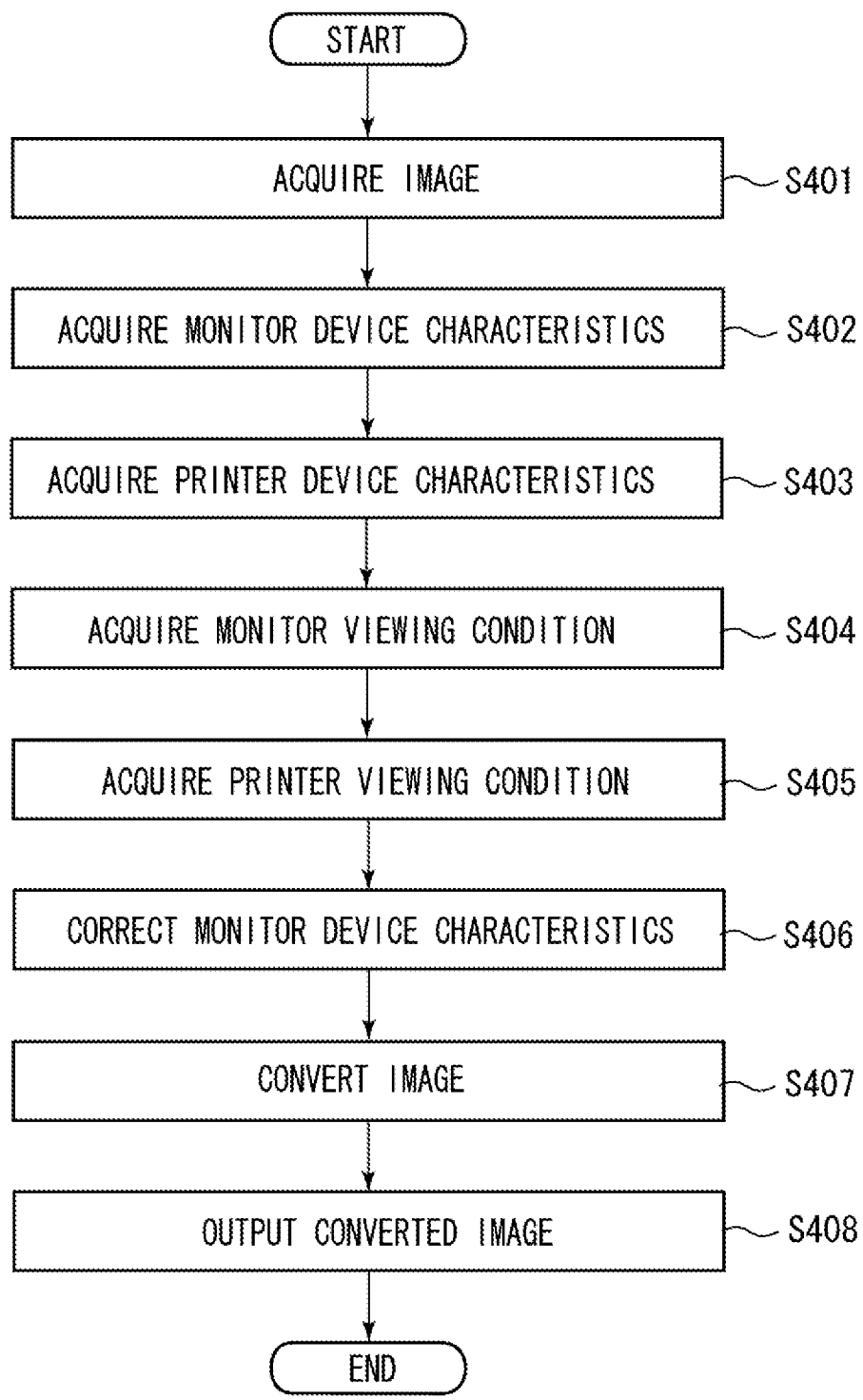
FIG. 4 is a flowchart illustrating in detail the image processing according to an exemplary embodiment of the present invention.

The image processing which performs the color matching of the image displayed on the monitor 101 and the image output by the printer 103 will now be described in more detail with reference to the flowchart diagram of FIG. 4.

In step S401, the image input unit 304 inputs an image. Here, the image input in the present exemplary embodiment is an RGB image according to sRGB. However, the input image may also be expressed in another color space.

In step S402, the device characteristic acquisition unit 301 acquires the device characteristic of the monitor 101 displaying the image. Here, the device characteristic acquired in the present exemplary embodiment is sRGB. However, some other typical monitor device model may also be used, and the device characteristic may also be measured data that is obtained by actually measuring the monitor under dark conditions.

In step S403, the device characteristic acquisition unit 301 acquires the characteristic of the output device (the device characteristic of the printer 103). Here, the printer 103 in the present exemplary embodiment is an inkjet printer into which RGB values are input. The printer 103 may also be a laser printer or a printer into which CMYK values are input.

The device characteristic data of an inkjet printer into which RGB values are input is a three-dimensional look-up table (3DLUT) which shows the correspondence between representative RGB values and CIEXYZ values. Representative RGB values are, for example, if the three-dimensional look-up table has 9×9×9 grid points, a color signal having the 729 data items (R, G, B)=(0, 0, 0), (0, 0, 32), (0, 0, 64), ..., (0, 0, 224), (0, 0, 255), (0, 32, 0), (0, 32, 32), ..., (255, 255, 255). The number of grid points is not limited to this, and may be set arbitrarily.

In step S404, the viewing condition acquisition unit 302 acquires the viewing condition of the monitor 101. Here, the viewing condition acquired in the present exemplary embodiment is a D65 illuminant according to sRGB. If a device characteristic different from sRGB was acquired in step S401, a viewing condition in line with the data of the device characteristic is acquired.

In step S405, the viewing condition acquisition unit 302 acquires the viewing condition of the image output by the printer 103. The viewing condition acquired in the present exemplary embodiment is a D50 illuminant (tristimulus values $(X_w, Y_w, Z_w)=(0.9642, 1.000, 0.8249)$), 600 [lx] (luminance of the adapting field $L_A=38.197$) viewing condition. The printer device characteristic changes according to the viewing condition. Thus, the acquired viewing condition corresponds to the device characteristic acquired in step S403. Further, the viewing condition is not limited to the above-described conditions, and may be some other condition.

In step S406, the device characteristic correction unit 303 corrects the device characteristic of the monitor 101 acquired in step S402 based on the viewing condition of the image display of the monitor 101. In the present exemplary embodiment, the viewing condition of the image display of the monitor 101 is the same as the viewing condition of the output image of the printer 103. Therefore, the viewing condition of the printer acquired in step S405 is used. It is noted that the viewing condition of the monitor 101 acquired in step S404 is a viewing condition corresponding to the device characteristic of the monitor 101, which in the present exemplary embodiment is a viewing condition corresponding to sRGB. Therefore, this is different from the actual viewing condition of the display image. The correction method will be described in detail below with reference to FIG. 5.

In step S407, the image conversion unit 305 converts the image acquired in step S401 based on the device characteristic that is corrected in step S406 and the viewing condition. The conversion method will be described in detail below with reference to FIG. 6.

In step S408, the image conversion unit 305 outputs the image converted in step S407 to the image output unit 306, and the printer 103 prints the image.

Figure 5:
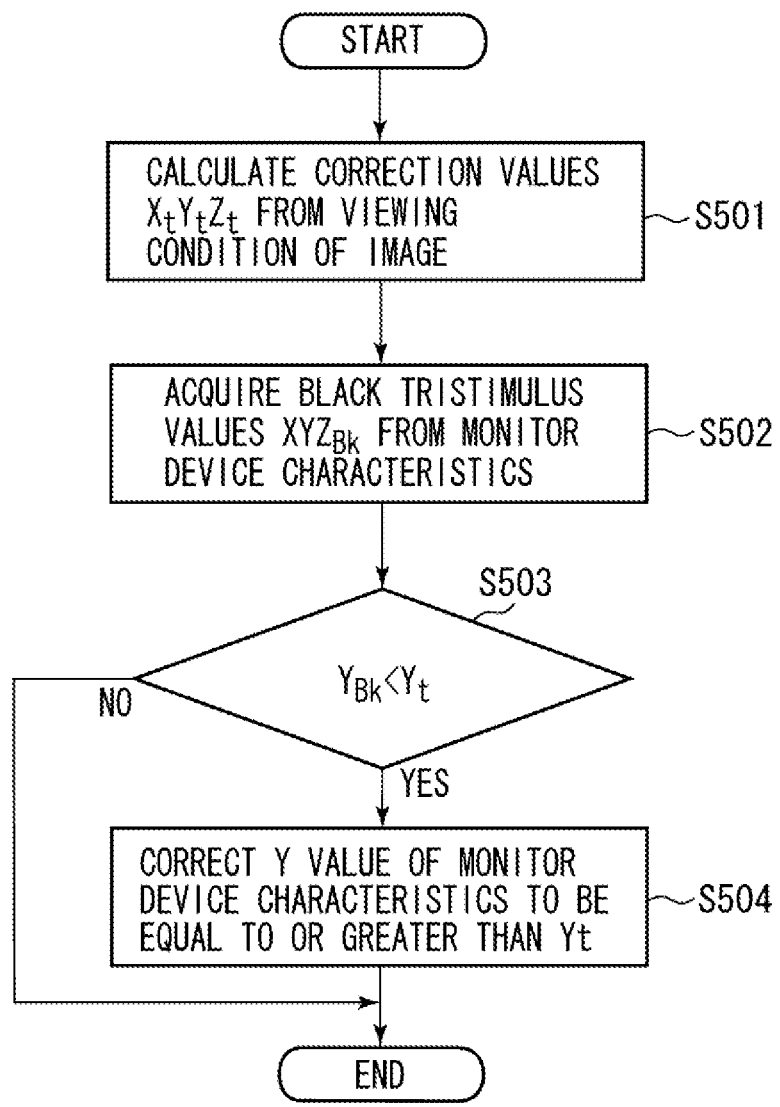
FIG. 5 is a flowchart illustrating a correction method of the monitor device characteristic according to an exemplary embodiment of the present invention.

An example of the correction of the device characteristic of the monitor 101 in step S406 will now be described in more detail with reference to the flowchart diagram of FIG. 5.

In step S501, the device characteristic correction unit 303 calculates the correction values for the device characteristic from the viewing condition of the output image acquired in step S405. If the viewing condition of the image is a D50 illuminant (tristimulus values $(X_w, Y_w, Z_w)=(0.9642, 1.000, 0.8249)$) at 600 [lx], and if the reflection of external light on the monitor surface is R, then the correction values $X_t Y_t Z_t$ are expressed by the following equations.

$$X_t = 0.9642 * \frac{600}{\pi} R \quad (1)$$
$$Y_t = 1.0000 * \frac{600}{\pi} R$$
$$Z_t = 0.8249 * \frac{600}{\pi} R$$

Here, the reflectance R may be listed in the device profile of the printer as a predetermined value according to the viewing condition, or may be listed in the device profile of the monitor which has been measured in advance. Further, the calculations for the correction values are not limited to those described above. For example, letting the luminance tristimulus values be $X_w Y_w Z_w$, the luminance of the adapting field be $L_A$, and a given correction function corresponding to the reflectance of external light on the monitor surface be γ (0<γ<1), then the correction values $X_t Y_t Z_t$ may be expressed by, for example, the following equations.

$$X_t = X_w * r$$
$$Y_t = Y_w * r$$
$$Z_t = Z_w * r, or$$
$$Y_t = 5 * L_A * r$$
$$X_t = X_w * (Y_t/Y_w)$$
$$Z_t = Z_w * (Y_t/Y_w) \quad (2)$$

In step S502, the device characteristic correction unit 303 acquires the black tristimulus values $X_{Bk} Y_{Bk} Z_{Bk}$ from the device characteristic of the monitor 101 acquired in step S402. For sRGB, $(X_{Bk} Y_{Bk} Z_{Bk})=(0, 0, 0)$.

In step S503, the device characteristic correction unit 303 compares the luminance $Y_t$ of the correction values $X_t Y_t Z_t$ calculated in step S501 with the luminance $Y_{Bk}$ of the black $X_{Bk} Y_{Bk} Z_{Bk}$ acquired in step S502. If the comparison results are that $Y_{Bk}<Y_t$ (YES in step S503), in step S504, the device characteristic correction unit 303 corrects the device characteristic of the monitor 101. If the comparison results are that $Y_t \leq Y_{Bk}$ (NO in step S503), the processing is finished. If consideration has already been given to the external light for the input device, duplication of the correction processing can be prevented since $Y_t \leq Y_{Bk}$.

Figure 20:
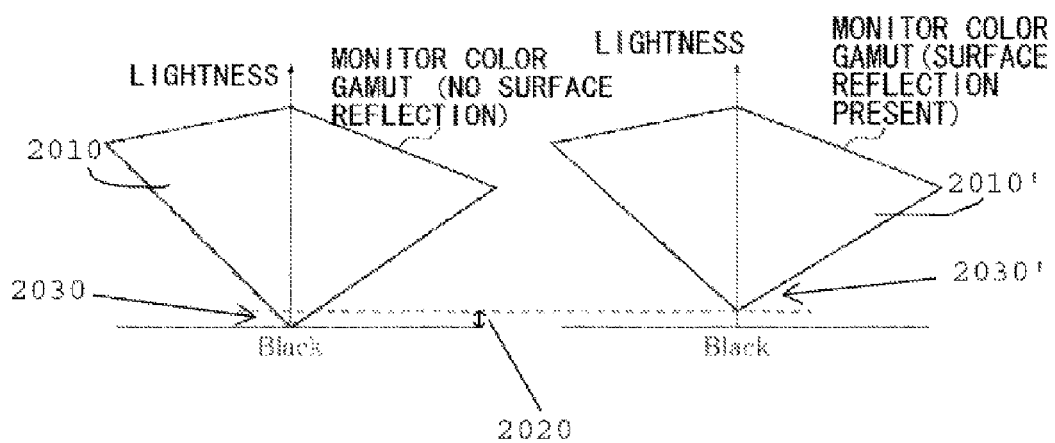
FIG. 20 is a diagram illustrating an example of the effects of external light reflection.

In step S504, as illustrated in FIG. 20, since the device characteristic close to black is especially affected by external light, the black luminance $Y_{Bk}$ of the monitor device characteristic is corrected so as to be equal to or greater than the $Y_t$ calculated in step S501. For example, letting the pre-correction tristimulus values be $X_{in}Y_{in}Z_{in}$, and the monitor white tristimulus values be $X_wY_wZ_w$, then the corrected tristimulus values $X_{out}Y_{out}Z_{out}$ can be expressed by the following equations.

$$X_{out} = \frac{X_w - X_t}{X_w - X_{Bk}}(X_{in} - X_{Bk}) + X_t \quad (3)$$

$$Y_{out} = \frac{Y_w - Y_t}{Y_w - Y_{Bk}}(Y_{in} - Y_{Bk}) + Y_t$$

$$Z_{out} = \frac{Z_w - Z_t}{Z_w - Z_{Bk}}(Z_{in} - Z_{Bk}) + Z_t$$

Further, the above-described correction equations may be applied to all of the monitor device characteristics, or the range to be applied may be restricted to the black region which is easily affected by external light. In addition, correction of the device characteristic is not limited to linear correction. For example, an appropriate gamma value can be set, and nonlinear correction may be applied according to the following equations.

$$X_t = X_t * \left[\frac{X_w - X_{in}}{X_w - X_{Bk}}\right]^y \quad (4)$$

$$Y_t = Y_t * \left[\frac{Y_w - Y_{in}}{Y_w - Y_{Bk}}\right]^y$$

$$Z_t = Z_t * \left[\frac{Z_w - Z_{in}}{Z_w - Z_{Bk}}\right]^y$$

Figure 6:
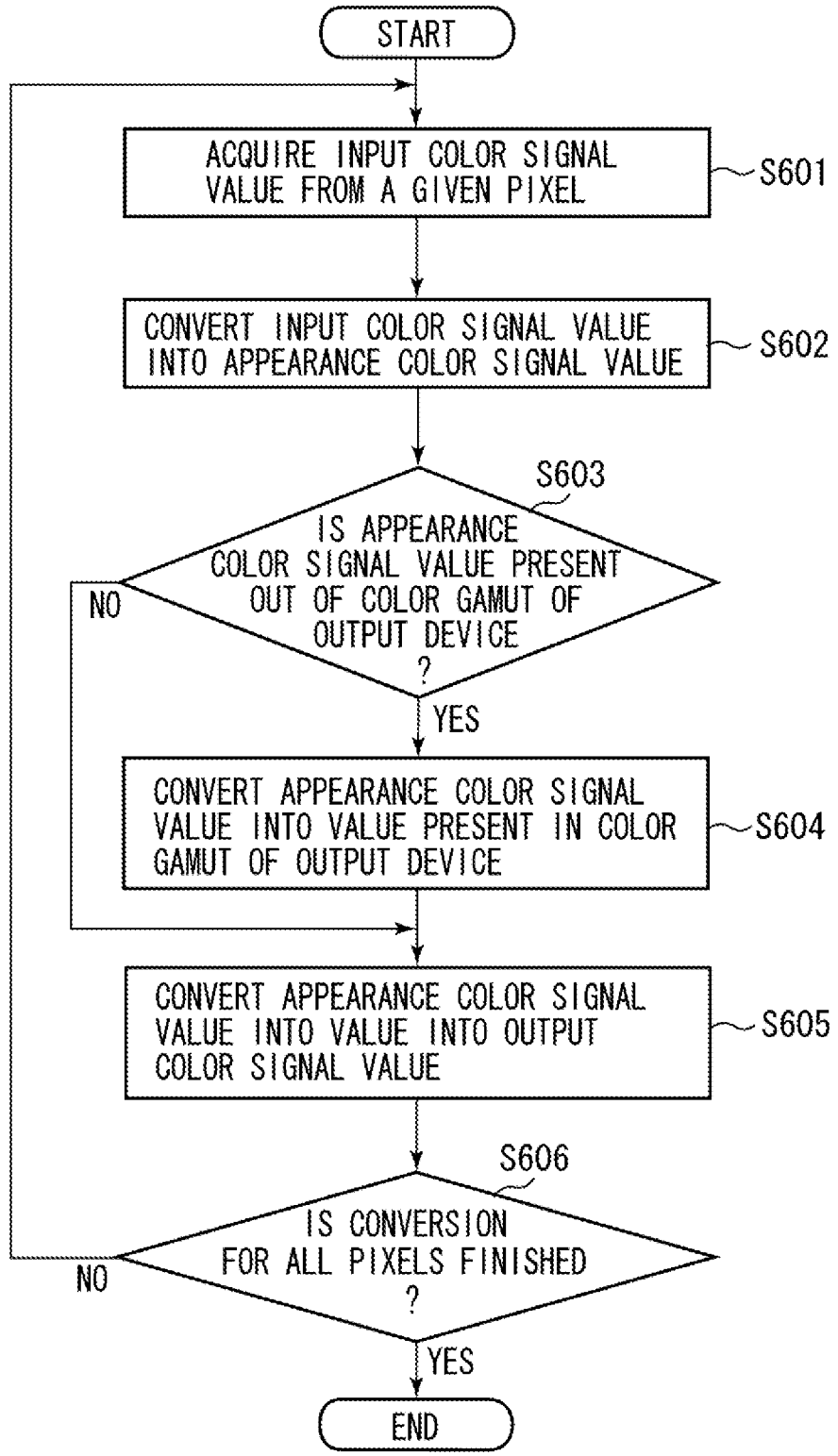
FIG. 6 is a flowchart illustrating the image conversion method according to an exemplary embodiment of the present invention.

The conversion processing performed on the image in step S407 will now be described in more detail with reference to the flowchart diagram of FIG. 6. Here, the color conversion processing of the color matching in the present exemplary embodiment will be described as performed in CIECAM02 appearance color space. However, a desired device-independent uniform color space, such as CIELAB or CIELUV, may also be used.

In step S601, the image conversion unit 305 acquires the input color signal value (RGB values) from a given pixel of the input image.

In step S602, the image conversion unit 305 converts the input color signal value acquired in step S601 to an appearance color signal value (Jab values) by CIECAM02 forward conversion. Conversion of the color signal value is performed in the following manner. First, the image conversion unit 305 converts the RGB values to CIEXYZ values according to the monitor device characteristic corrected in step S406. Then, the image conversion unit 305 obtains the appearance color signal value from the CIEXYZ values by CIECAM02 forward conversion according to an appearance parameter of the viewing condition acquired in step S404.

Figure 7:
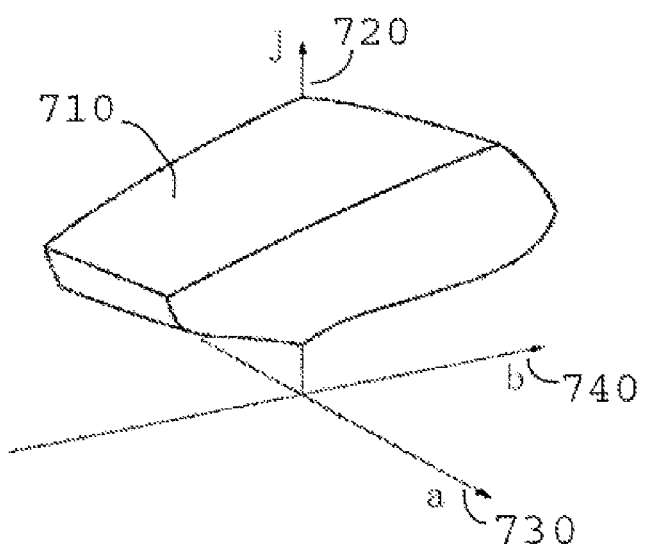
FIG. 7 is a diagram illustrating the outline of a color gamut.

In step S603, the image conversion unit 305 determines whether the appearance color signal value converted in step S602 is present in the color gamut of the output device. As shown in FIG. 7, the color gamut 710 is expressed in three-dimensional space with lightness J and chromaticity a, b as axes (i.e., axes 720, 730, and 740, respectively). If the input color signal value is out of the output color gamut (YES in step S603), the processing proceeds to step S604. If the input color signal values are within the output color gamut (NO in step S603), the processing proceeds to step S605.

Figure 8A:
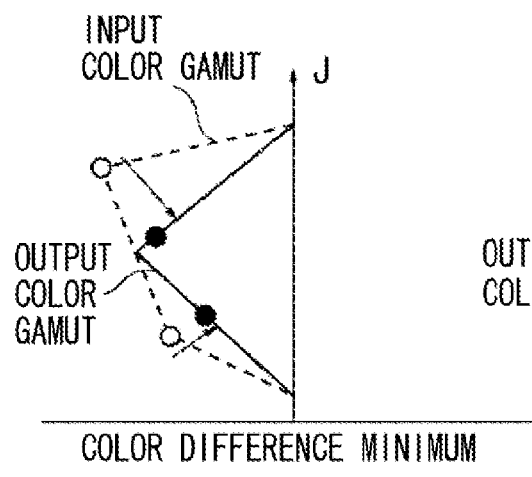
FIGS. 8A and 8B are diagrams illustrating an example of a color gamut conversion method.
Figure 8B:
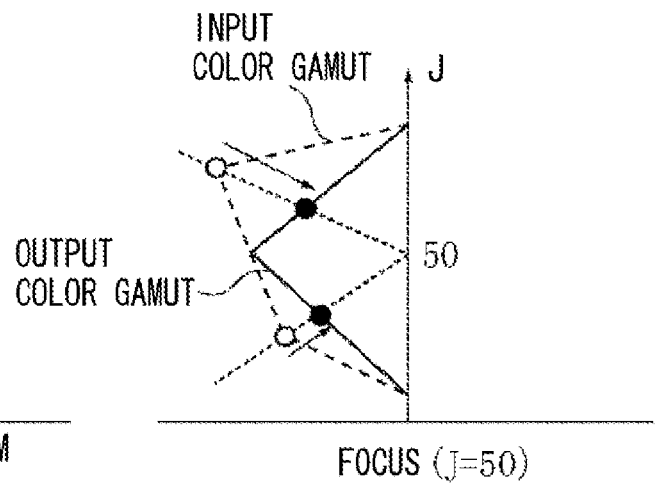

In step S604, the image conversion unit 305 converts an appearance color signal value which is out of the output color gamut to a color signal value which is within the input color gamut. Various methods may be used as the conversion method. An example of the conversion methods illustrated in FIGS. 8A and 8B will now be described. The diagrams of FIGS. 8A and 8B are cross-sectional views cut across a desired color phase of the color gamut 710 of FIG. 7. FIG. 8A illustrates a method for performing conversion so that the color difference before and after color conversion is at a minimum. FIG. 8B illustrates a method in which an appropriate focus is determined, such as (J, a, b)=(50, 0, 0) in the appearance color space, to perform mapping in an intersecting direction of a straight line connecting that focus with the input color signal and the output color gamut.

In step S605, the image conversion unit 305 converts the appearance color signal value into an output color signal value by CIECAM02 inverse conversion. First, the image conversion unit 305 converts the appearance color signal value into CIEXYZ values by carrying out a CIECAM02 inverse conversion according to the appearance parameter of the viewing condition acquired in step S405. Next, the image conversion unit 305 estimates the output color signal value using a desired estimation method, such as the steepest descent method or Newton's method, according to the device characteristic of the printer acquired in step S403, and converts the CIEXYZ values into an output color signal value (Device RGB values).

In step S606, the image conversion unit 305 determines whether the conversion for all the pixels has finished. If conversion for all the pixels has finished (YES in step S606), the processing is finished. If conversion for all the pixels has not finished (NO in step S606), the processing returns to step S601.

According to the present exemplary embodiment, the appearance of an image displayed on a monitor is estimated by correcting the monitor device characteristic under dark conditions based on the viewing condition of the image. By using this corrected monitor device characteristic to carry out color matching, the matching accuracy under a desired viewing condition can be improved. Further, since in the present method the monitor device characteristic under dark conditions is corrected according to the viewing condition, arbitrary viewing conditions can be handled.

The calculation method of the correction value of the device characteristic in step S501 of the exemplary embodiment described above and the correction method of the device characteristic in step S504 may be any desired method. Another exemplary embodiment for the calculation method of the correction value of the device characteristic and the correction method of the device characteristic will now be described below.

The calculation method of the correction value of the device characteristic in step S501 may be any method so long as the correction value can be determined according to the viewing condition. For example, the correction value may be listed in the device profile of the printer as $Y_{average}$, $Y_{dim}$ and the like in advance according to the surroundings, which are a viewing condition parameter. Then, the correction value may be switched according to the relationship between the white luminance $Y_{monitor}$ of the monitor and the luminance $Y_{image}$ of the viewing condition illumination. Here, letting the desired switching threshold be T, the relationship with the correction value $Y_t$ can be found by the following equation.

$$\text{If } Y_{image}/Y_{monitor} < T \text{ then } Y_t = Y_{dim} \quad (5)$$
$$\text{Else } Y_t = Y_{average}$$

The correction values $X_t$ and $Z_t$ are calculated by the method described above. As described above, a parameter set in advance does not have to be discrete, and may be calculated from a desired relationship.

While an example of a device characteristic correction equation was shown in the above-described exemplary embodiment as the correction method for a device characteristic in step S504, the correction values $X_t Y_t Z_t$ may be corrected simply by adding them to the device characteristics $X_m Y_m Z_m$ as indicated by the following equation.

$$X_{out} = X_{in} + X_t$$
$$Y_{out} = Y_{in} + Y_t$$
$$Z_{out} = Z_{in} + Z_t \quad (6)$$

However, because white is also corrected in the same way in the present exemplary embodiment, the white of the monitor device characteristic may not be reproduced as white in the printed matter from the printer. Thus, white reproduction may be corrected according to the following method. For example, the white tristimulus values acquired in step S404 of the above-described exemplary embodiment may be replaced with the white tristimulus values corrected in the present exemplary embodiment, or the device characteristic may be re-corrected by applying the following equation on the corrected device characteristic.

$$X''_{out} = (X'_{in} - X'_{Bk})\frac{X_w}{X'_w} + X'_{Bk} \quad (7)$$
$$Y''_{out} = (Y'_{in} - Y'_{Bk})\frac{Y_w}{Y'_w} + Y'_{Bk}$$
$$Z''_{out} = (Z'_{in} - Z'_{Bk})\frac{Z_w}{Z'_w} + Z'_{Bk}$$

Here, the before-correction white tristimulus values are $X_w Y_w Z_w$, the corrected input value and white and black tristimulus values according to the correction values $X_t Y_t Z_t$ are respectively $X_{in}'Y_{in}'Z_{in}'$, $X_w'Y_w'Z_w'$, and $X_{Bk}'Y_{Bk}'Z_{Bk}'$.

Further, the above-described embodiment was described for the case where the image displayed on the monitor and the image output by the printer were viewed at the same location. However, the above-described exemplary embodiment can also be applied in cases where, for example, an image taken with a digital camera is displayed on a monitor. In such a case, it is necessary to acquire the viewing condition for viewing the image displayed on the monitor. Examples of an acquisition method may include manual instruction by a user, or measuring with a sensor. Then, the monitor device characteristic is corrected using the same method as in FIG. 5. Here, color processing is carried out in the same manner as in FIG. 4 with the digital camera as the source device and the monitor as the destination device. In this way, the above-described exemplary embodiment can be applied to color matching among various devices.

Another exemplary embodiment of the present invention will now be described. First, the method for correcting the monitor calorimetric value depending on the illumination will be described.

Since a monitor works using additive color mixing, the calorimetric values $XYZ_{B-C}$ of the monitor in an environment B can be determined using equation (8) based on the calorimetric values $XYZ_{A-C}$ of the monitor in an environment A, the black calorimetric values $XYZ_{A\_Bk-C}$ of the monitor in the environment A and the black calorimetric values $XYZ_{B\_Bk-C}$ of the monitor in the environment B.

$$XYZ_{B-C} = XYZ_{A-C} - XYZ_{A\_Bk-C} + XYZ_{B\_Bk-C} \quad (8)$$

Thus, when the calorimetric values $XYZ_{A-C}$ of the monitor in the environment A are present, if the black calorimetric values $XYZ_{B\_Bk-C}$ of the monitor in the environment B can be calculated from the illumination information of the environment B, the calorimetric values $XYZ_{B-C}$ of the monitor in the environment B can be determined.

Figure 19:
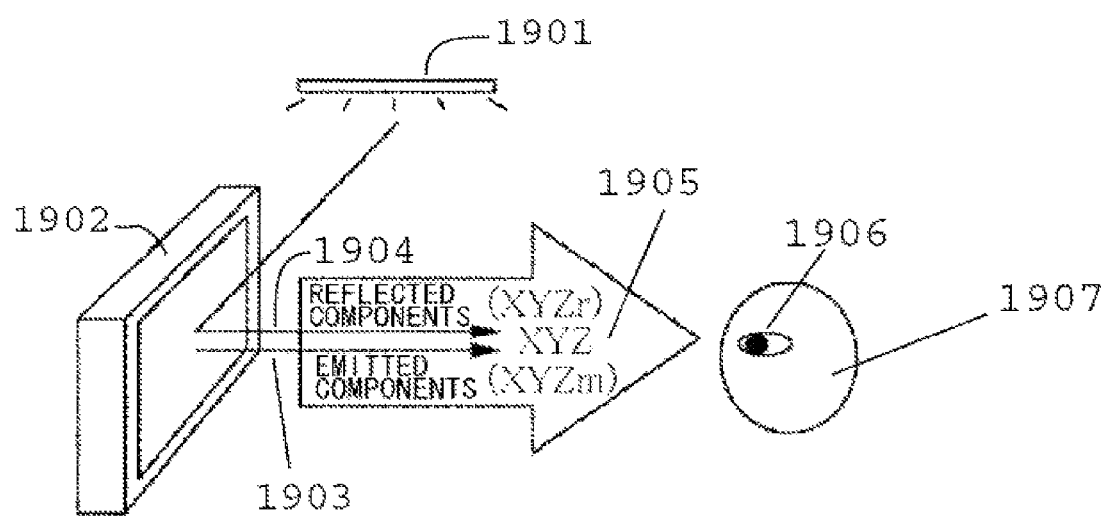
FIG. 19 is a diagram illustrating an example of external light reflection on the monitor screen.

As illustrated in FIG. 19, the appearance XYZ (1905) of color on the monitor 1902 which enters a person's eye 1906 consists of light XYZm (1903) which the monitor 1902 itself emits and light XYZr (1904) which is light from the illumination 1901 reflected by the surface of the monitor 1902.

$$XYZ_{B-C} = XYZ_{B-M} + XYZ_{B-R} \quad (9)$$

Since this naturally also holds for the black calorimetric values of the monitor, $XYZ_{B\_Bk-C}$ can be determined by the following equation:

$$XYZ_{B\_Bk-C} = XYZ_{B\_Bk-M} + XYZ_{B\_Bk-R} \quad (10)$$

Light emitted from the monitor itself is uniform if the settings are the same. However, since the surface reflection component varies depending on the illumination, it is necessary to correct the calorimetric values according to the illumination. The $XYZ_{B\_Bk-M}$ values can be obtained by colorimetry of the monitor black under dark conditions where surface reflection does not occur. Thus, if values of the surface reflected component $XYZ_{B\_Bk-R}$ can be calculated based on the illumination information, the black calorimetric values $XYZ_{B\_Bk-C}$ of the monitor in the environment B can be determined.

The values of the surface reflected component $XYZ_{B\_Bk-R}$ can be calculated using equation (11) from the illumination $XYZ_{B\_L}$ values and the surface reflectance R.

$$XYZ_{B\_Bk-R} = XYZ_{B\_L} * R \quad (11)$$

From equations (10) and (11), the following equation (12) holds:

$$R = (XYZ_{B\_Bk-R} - XYZ_{B\_Bk-M})/XYZ_{B\_L} \quad (12)$$

Since the surface reflectance R is independent of the illumination, the reflectance R is determined in advance and written into the device profile. For example, the surface reflectance R may be written in the private data of the device profile. Further, the $XYZ_{B\_Bk-R}$ values in equation (10) can be known by adopting a calorimetric value under darkness determined using a non-contact chromometer or a calorimetric value determined using a contact chromometer (e.g. RGB isogrid 729 colors). Since the surface reflectance R is also known, if the remaining XYZ values of the illumination can be acquired, then the calorimetric values that also include the surface reflected component under that illumination can be calculated.

Since in the present exemplary embodiment it is assumed that a sensor for acquiring the illumination information is not present, the illumination information must be acquired by a method other than measuring. In the present exemplary embodiment, since for monitor and printer matching in most cases the monitor and the printed matter are typically compared under the same illumination, the XYZ values of the illumination are acquired from the viewing condition information in the printer profile.

Figure 10:
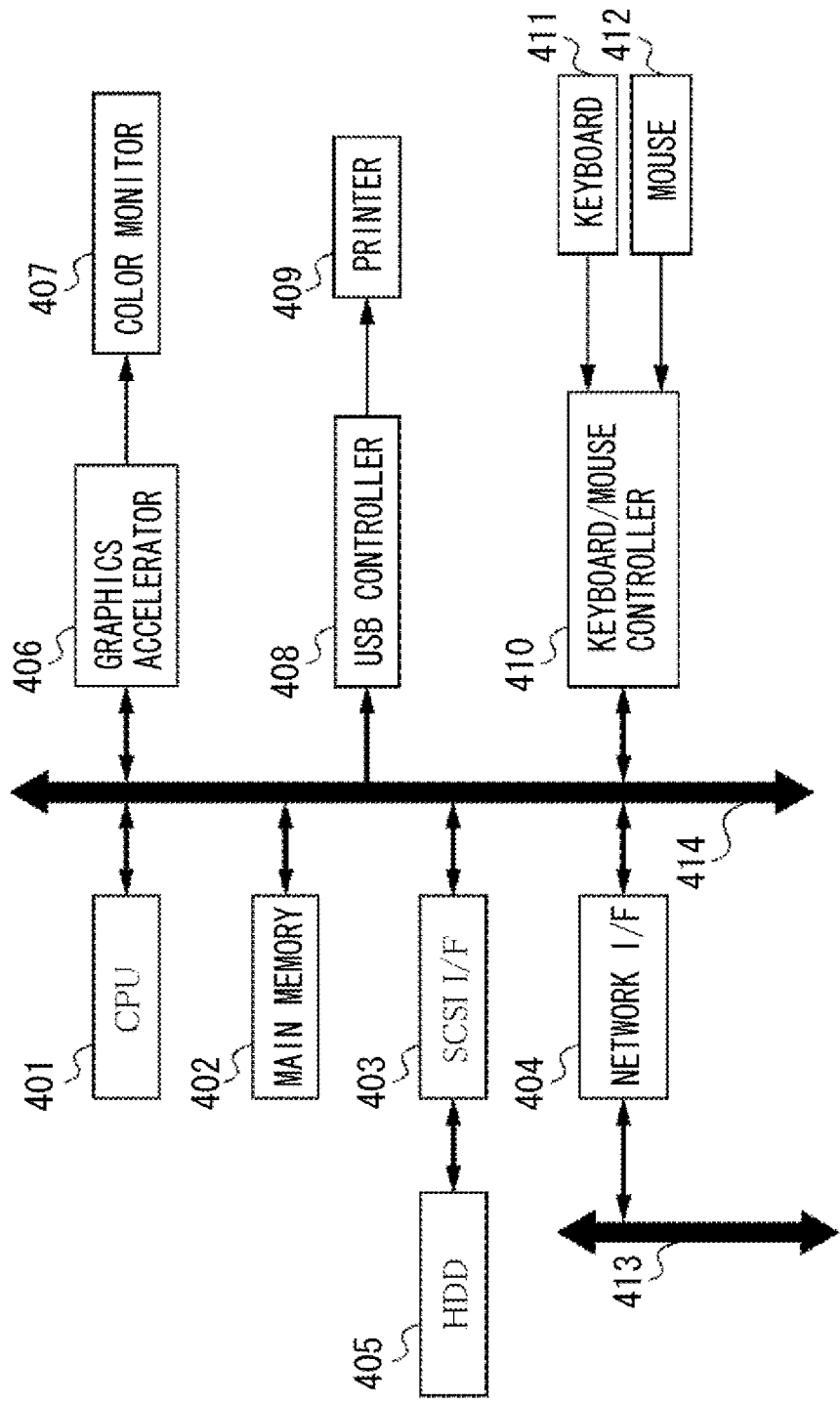
FIG. 10 is a block diagram illustrating the system configuration of the color processing apparatus according to an exemplary embodiment of the present invention.

FIG. 10 is a block diagram of the color processing apparatus according to the present exemplary embodiment. This color processing apparatus includes a CPU 401, a main memory 402, a SCSI interface 403, a network interface 404, an HDD 405, a graphics accelerator 406, a color monitor 407, a Universal Serial Bus (USB) controller 408, a color printer 409, a keyboard/mouse controller 410, a keyboard 411, a mouse 412, a local area network 413 and a peripheral component interconnect (PCI) bus 414.

The printer output operation of a digital image in the color processing apparatus will now be described.

First, an image application, which is a program stored in the recording medium HDD 405, is launched by the CPU 401 based on the operating system (OS) program which received an instruction from a user. According to the processing of the image application, digital image data stored in the HDD 405 is transferred to the main memory 402 through the PCI bus 414 via the SCSI I/F 403 based on an instruction from the CPU 401. Alternatively, image data stored on a server connected to a LAN, or digital image data on the Internet, is transferred to the main memory 402 through the PCI bus 414 via the network I/F 404 based on the instruction from the CPU 401. An example will be described below in which digital image data held in the main memory 402 has each of the RGB color signals expressed in non-encoded 8-bit data. The digital image data held in the main memory 402 is transferred to the graphics accelerator 406 through the PCI bus 414 based on an instruction from the CPU 401. The graphics accelerator 406 performs digital-to-analog (D/A) conversion on the digital image data and then sends the converted data to the color monitor 407 via a display cable, where an image is displayed on the color monitor 407. If a user instructs the image application to output a digital image held in the main memory 402 from the printer 409, the image application transfers the digital image data to a printer driver. The CPU 401 converts the digital image data into CMYK digital image data based on the below-described processing flowchart of the printer driver, and sends the CMYK digital image data to the printer 409 via the USB controller 408. As a result of the above series of operations, a CMYK image is printed from the printer 409.

Figure 11:
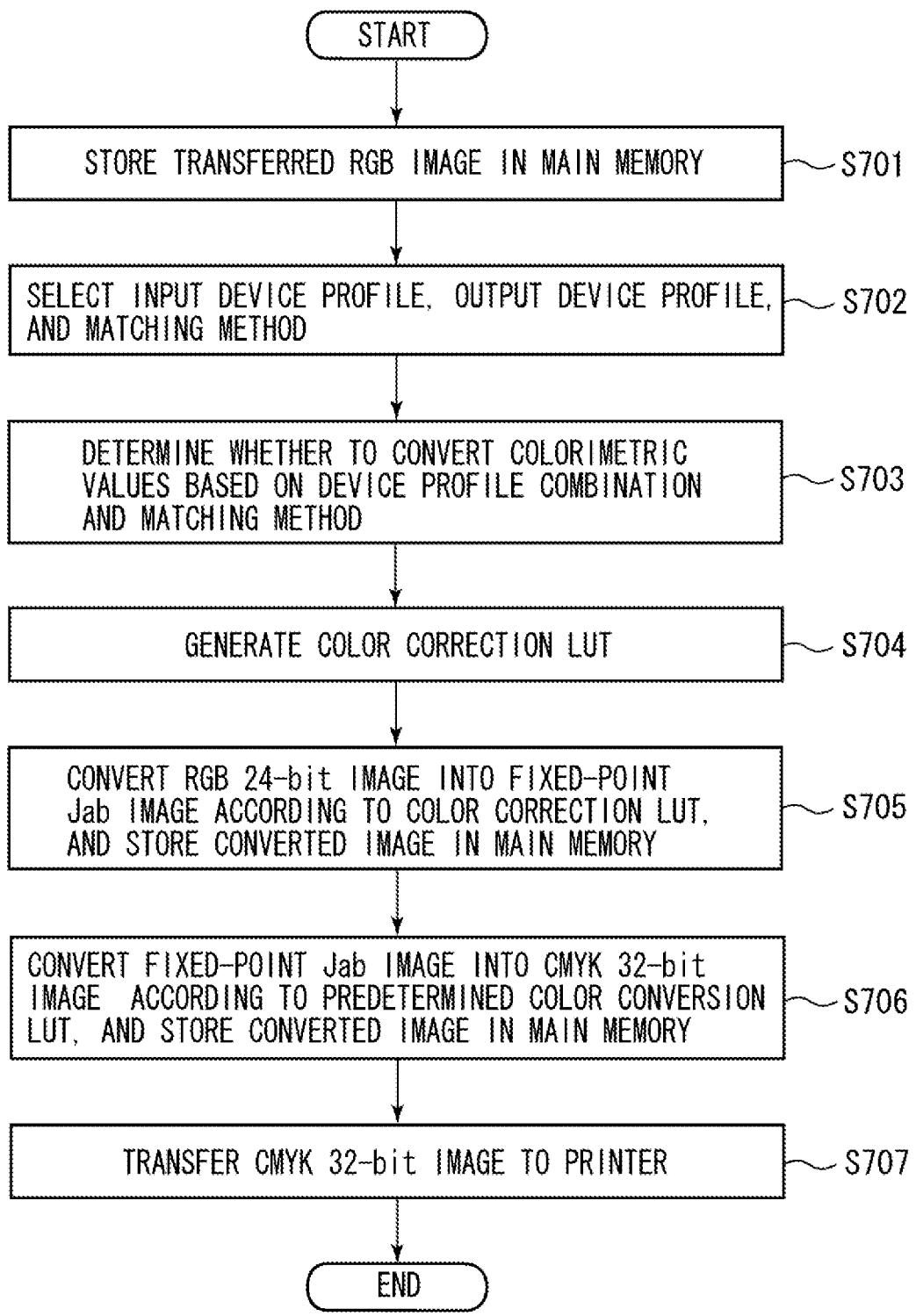
FIG. 11 is a flowchart illustrating the processing of a printer driver in the color processing apparatus according to an exemplary embodiment of the present invention.

The printer driver operation will now be described with reference to the flowchart of FIG. 11. First, in step S701, the CPU 401 stores the transferred RGB 24-bit image data (each color signal being non-encoded 8-bit image data) in the main memory 402.

Figure 12:
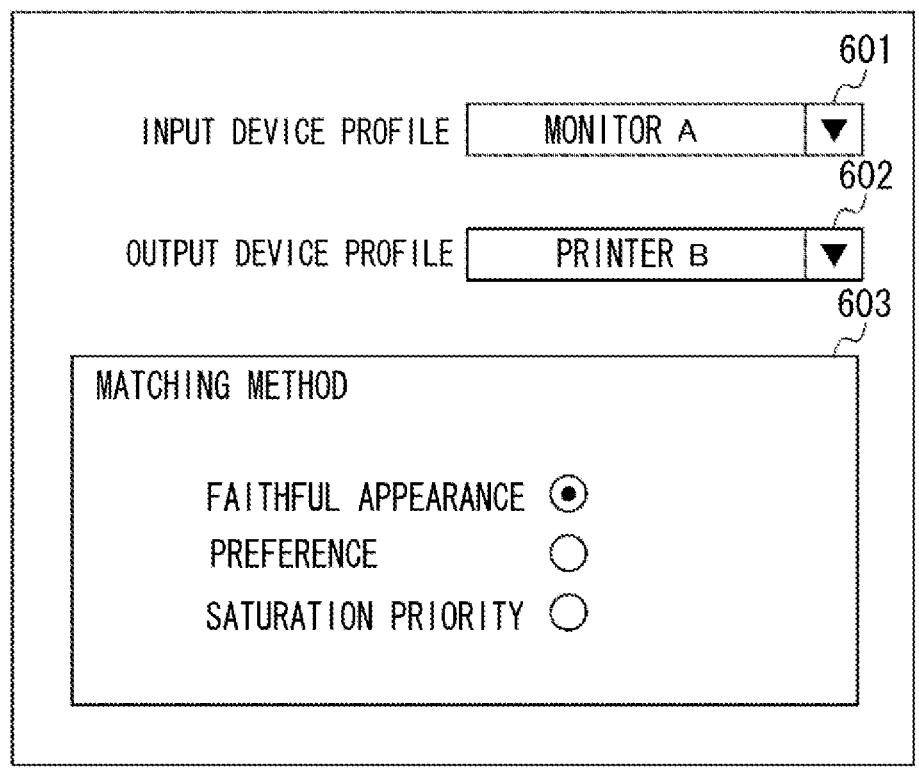
FIG. 12 is a diagram illustrating the graphical user interface (GUI) for selecting the profile and matching method according to an exemplary embodiment of the present invention.

In step S702, the user selects the input device profile, output device profile, and the matching method. FIG. 12 illustrates one example of a graphical user interface (GUI) for inputting a user instruction to select a profile. In FIG. 12, the GUI includes a dropdown combo box for selecting an input device profile 601, a dropdown combo box for selecting an output device profile 602, and a radio buttons for selecting a matching method 603.

FIG. 9 is a diagram illustrating an example of the structure of a device profile. The profile includes a header section for listing the appearance parameter and the like, and a device data storage section which lists the correspondence between the signal value of a device (RGB for a display) and the calorimetric value when a color patch whose signal value is known is displayed or output.

In the appearance parameter, the white tristimulus values, luminance of the adapting field, background luminance, and paper environment condition are set. When the device itself emits light, such as in the case of a monitor, the white tristimulus values of that device are set for the white tristimulus values. For a printer or the like which handles reflecting matter, the white tristimulus values are set as the illumination light information for viewing the reflecting matter.

In step S703, the CPU 401 determines whether to convert the calorimetric value in the device profile based on the selected device profile combination and the matching method. This is described in further detail below with reference to FIG. 14. Then, if it is determined to perform conversion, the calorimetric value is converted.

In step S704, the CPU 401 generates a color correction LUT. The color correction LUT lists the correspondence between color coordinate data of the grid points in RGB color space and the coordinate values of the Jab color space which is reproduced by the grid points. The color correction LUT has a data structure such as the one illustrated in FIG. 13. At the top of the data structure, the steps of the R/G/B values are listed. Below that, the J value, a value, and b value, which are the output values corresponding to each grid point, are listed in a nested manner in the order of R, G, B. Processing of step S704 is described in further detail below with reference to FIG. 15.

In step S705, the CPU 401 converts RGB 24-bit image data into Jab fixed-point data based on the color correction LUT, and again stores the converted data in the main memory 402. Tetrahedron interpolation is used for the conversion.

In step S706, the CPU 401 converts this Jab fixed-point data into CMYK 32-bit image data (CMYK 8-bit image data wherein each color signal is non-encoded) according to a predetermined color conversion LUT, and again stores the converted data in the main memory 402.

In step S707, the CPU 401 sends the CMYK 32-bit image data stored in the main memory 402 to the printer 409 via the USB controller 408.

Figure 14:
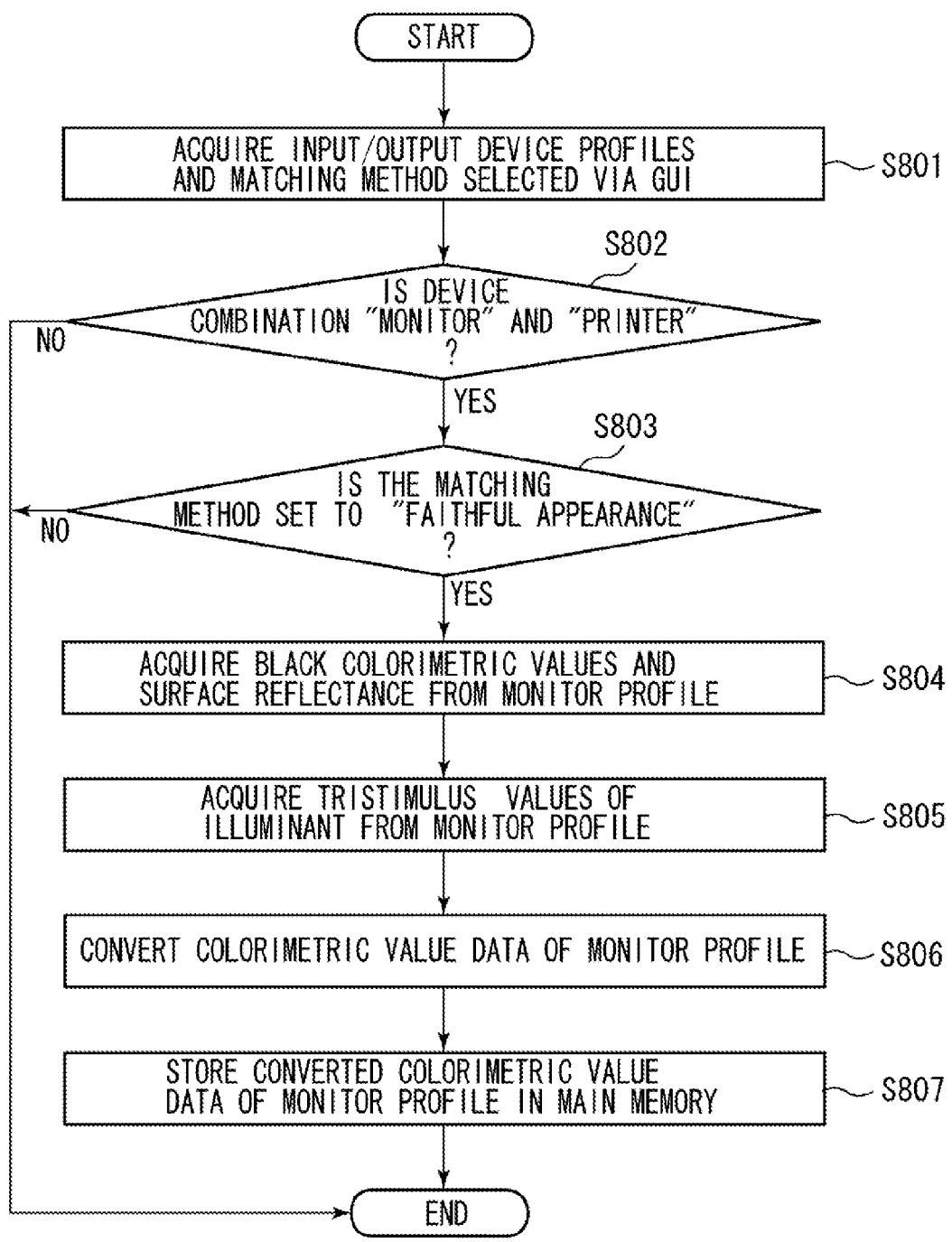
FIG. 14 is a flowchart illustrating the processing for converting the calorimetric value data of a monitor profile according to the illumination according to an exemplary embodiment of the present invention.

The calorimetric value conversion processing of step S703 will now be described with reference to the flowchart of FIG. 14.

In step S801, the CPU 401 acquires the input/output device profiles and matching method which were selected in step S702.

In step S802, the CPU 401 determines whether the selected input/output device profile combination is "monitor" and "printer". If the determination result is true (YES in step S802), the processing proceeds to step S803. If the result is false (NO in step S802), the processing is finished.

In step S803, it is determined whether the acquired matching method is set to "faithful appearance". If the determination result is true (YES in step S803), the processing proceeds to step S804. If the result is false (NO in step S803), the calorimetric value conversion processing is finished.

In step S804, the CPU 401 acquires the black calorimetric $XYZ_{Bk\text{-}C}$ values and the surface reflectance R from the monitor profile.

In step S805, the CPU 401 acquires the tristimulus values $XYZ_L$ as illumination light information from the printer profile.

In step S806, first the CPU 401 calculates the black calorimetric $XYZ_{Bk\text{-}C}'$ values of the monitor under the current illumination using the following equation (13). Next, the CPU 401 converts the calorimetric value data $XYZ_C$ of the monitor profile based on the following equation (14) using the calculated $XYZ_{Bk\text{-}C}'$ values, and calculates the calorimetric values of the monitor under the current illumination.

$$XYZ_{Bk\text{-}C}' = XYZ_{Bk\text{-}C} + XYZ_L * R \quad (13)$$

$$XYZ_C' = XYZ_C - XYZ_{Bk\text{-}C} + XYZ_{Bk\text{-}C}' \quad (14)$$

In step S807, the CPU 401 stores the converted monitor calorimetric value data in the main memory 402.

Figure 15:
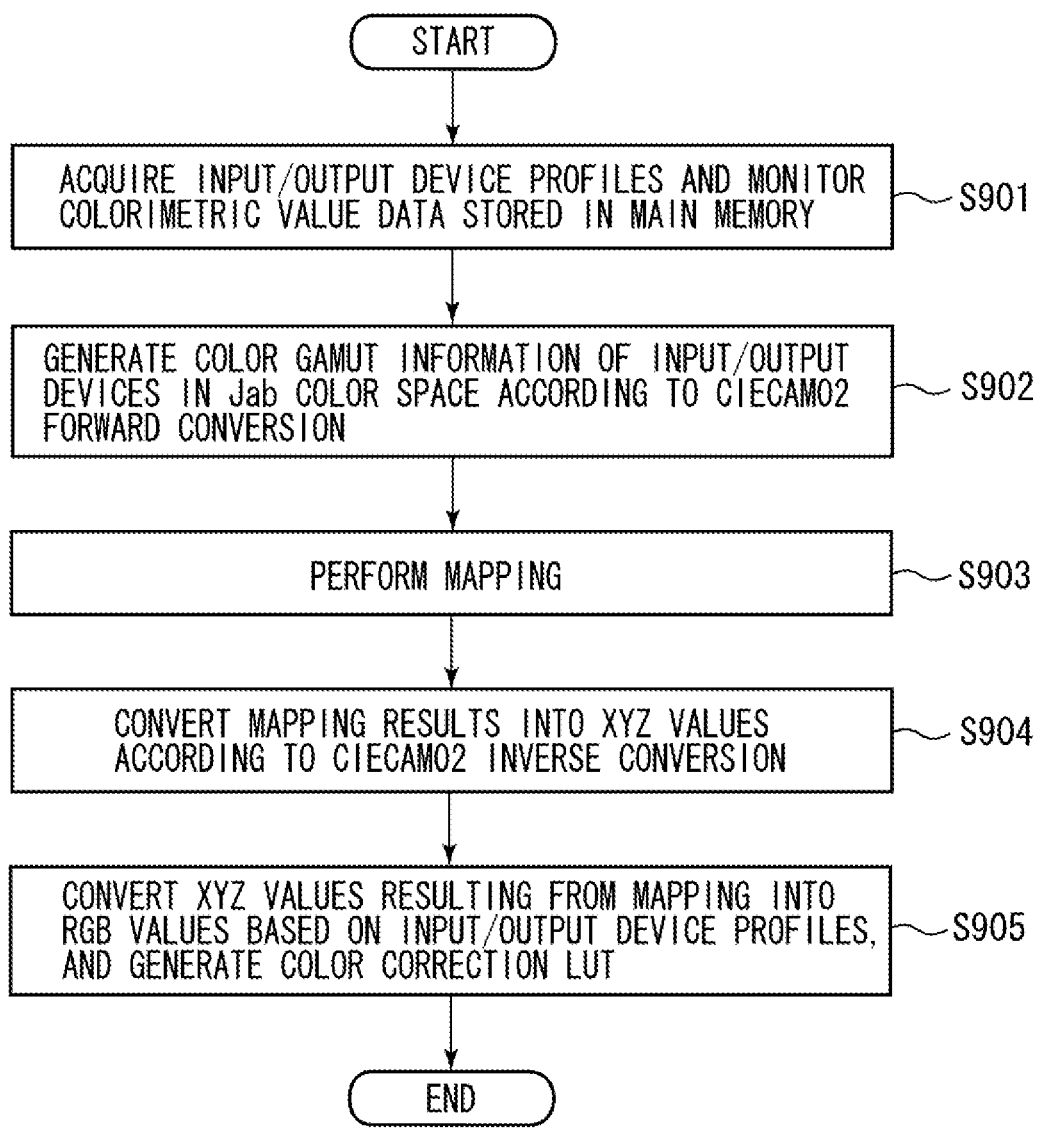
FIG. 15 is a flowchart illustrating the processing for generating the color correction LUT according to an exemplary embodiment of the present invention.

The processing for generating color correction LUT of step S704 will now be described with reference to the flowchart of FIG. 15.

In step S901, the CPU 401 acquires the input/output device profiles and the monitor calorimetric value data stored in the main memory 402. The "monitor calorimetric value data stored in the main memory 402" is the calorimetric value data stored in step S807. That is, the calorimetric value data corrected according to the tristimulus values of the illumination of the printer profile. If the monitor calorimetric value data is not stored in the main memory 402, the CPU 401 only acquires the device profiles.

Figure 16:
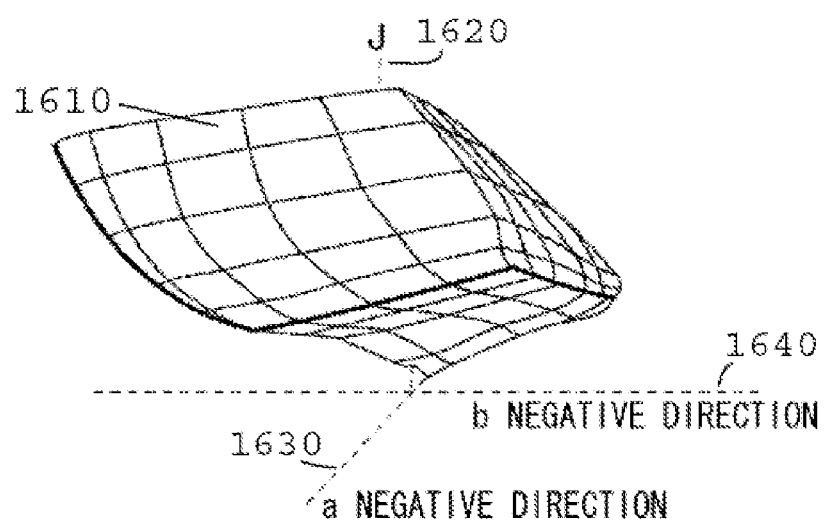
FIG. 16 is a diagram illustrating one example of color gamut information.

In step S902, based on the acquired input/output device profiles, the CPU 401 generates color gamut information of the input/output devices in Jab color space according to CIECAM02 forward conversion. One example of this information is illustrated in FIG. 16 as color gamut information 1610, which is expressed in three-dimensional space with J, a, and b axes (i.e., axes 1620, 1630, and 1640, respectively). It is noted that the color gamut information 1610 is expressed as a combination of multiple polygons. Processing of step S902 is described in further detail below with reference to FIG. 17.

In step S903, the CPU 401 performs gamut mapping in Jab color space using the color gamut information of the input/output devices. Namely, the CPU 401 maps the color gamut of the input device to the color gamut of the output device.

In step S904, the CPU 401 converts the mapping results of step S903 from Jab values into XYZ values using the appearance parameter of the output device profile according to CIECAM02 inverse conversion.

In step S905, the CPU 401 converts the XYZ values into RGB values using the output device profile, and generates a color correction LUT.

Figure 17:
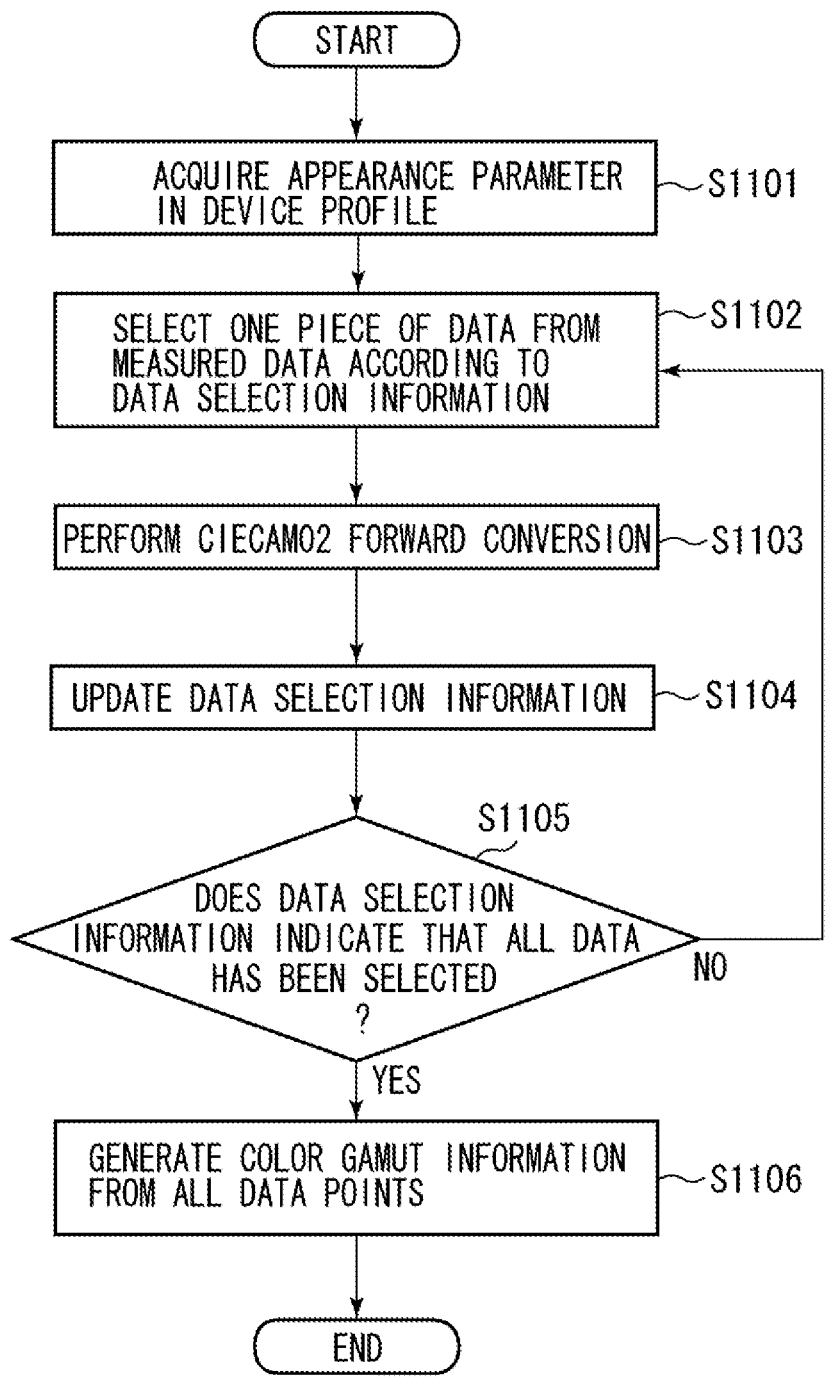
FIG. 17 is a flowchart illustrating the processing for generating color gamut information from the input device profile according to an exemplary embodiment of the present invention.
Figure 18:
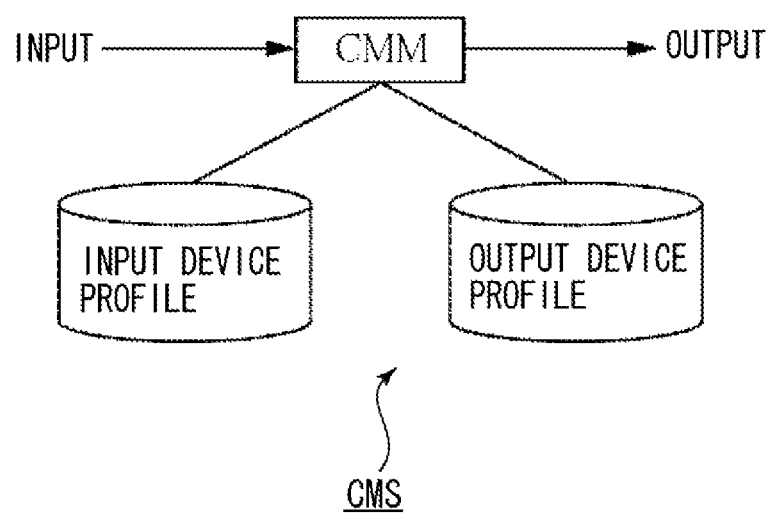
FIG. 18 is a block diagram illustrating the configuration of a color management system.

The processing in step S902 illustrated in FIG. 15 for generating color gamut information from the input/output device profiles in Jab color space will now be described with reference to the flowchart of FIG. 17.

In step S1101, the CPU 401 acquires an appearance parameter in the device profile.

In step S1102, the CPU 401 selects one piece of data from the measured data and acquires the information. In step S1103, the CPU 401 converts the measured data that is selected in step S1102 into Jab values using CIECAM02 forward conversion. In step S1104, the CPU 401 updates the selected data information so that different data will be newly selected next. In step S1105, the CPU 401 determines whether all data has been selected. If the determination is true (YES in step S1105), the processing proceeds to step S1106. If the determination is false (NO in step S1105), the processing returns to step S1102.

In step S1106, the CPU 401 generates color gamut information in Jab color space from all data points converted to Jab values.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2007-140558 and 2007-140559, both filed May 28, 2007, which are hereby incorporated by reference herein in their entirety.

What is claimed is:

1. A color processing apparatus for color matching between an image displayed on a monitor device and an image printed by a printer device under a same viewing condition, the color processing apparatus comprising:

a device characteristic acquisition unit configured to acquire a monitor device characteristic including black tristimulus values from a monitor device profile of the monitor device;

a viewing condition acquisition unit configured to acquire an output viewing condition from a printer device profile of a printer device without measuring the output viewing condition;

a correction unit configured to correct the monitor device characteristic so as to correct the black tristimulus values of the monitor device characteristic based on the output viewing condition to obtain correction values;

a determination unit configured to determine whether to perform correction of a value of the monitor device characteristic based on a result of comparing a luminance value of the correction values and a luminance value of the black tristimulus values, wherein, if the luminance value of the correction values is greater than the luminance value of the black tristimulus values, the correction unit is further configured to correct the luminance value of the black tristimulus values so that the corrected luminance value of the black tristimulus values is greater than or equal to the luminance value of the correction values; and a color conversion unit configured to perform color conversion based on the output viewing condition and the corrected luminance value of the monitor device characteristic, wherein the device characteristic acquisition unit is configured to acquire a printer device characteristic in addition to the monitor device characteristic, and the color conversion unit is configured to perform color conversion for matching an input image displayed on the monitor device with an output image to be output by the printer device.

2. The color processing apparatus according to claim 1, wherein the monitor device characteristic indicates correspondence between a display signal value of the monitor device and a colorimetric value.

3. The color processing apparatus according to claim 1, wherein the output viewing condition includes appearance parameters.

4. The color processing apparatus according to claim 1, wherein the viewing condition acquisition unit is configured to acquire an input viewing condition from the monitor device profile.

5. The color processing apparatus according to claim 4, wherein the color conversion unit is configured to convert an input color signal value into an appearance color signal value based on the monitor device characteristic and the input viewing condition, convert the appearance color signal value into an in-gamut-color value of the printer device, and convert the converted appearance color signal value into an output color signal value based on the printer device characteristic and the output viewing condition.

6. The color processing apparatus according to claim 4, wherein the color conversion unit is configured to convert an input device-dependent color signal value into an input device-independent color signal value based on the corrected monitor device characteristic and to convert the device-independent color signal value to an appearance color signal value based on the input viewing condition.

7. A color processing method comprising:

acquiring a monitor device characteristic including black tristimulus values from a monitor profile of a monitor device;

acquiring an output viewing condition from a printer profile of a printer device without measuring the output viewing condition;

correcting the monitor device characteristic so as to correct the black tristimulus values of the monitor device characteristic based on the output viewing condition to obtain correction values;

comparing a luminance value of the correction values with a luminance value of the black tristimulus values;

determining whether to perform correction of a value of the monitor device characteristic based on a result of comparing the luminance value of the correction values with the luminance value of the black tristimulus values;

if the luminance value of the correction values is greater than the luminance value of the black tristimulus values, correcting the luminance value of the black tristimulus values so that the corrected luminance value of the black tristimulus value is greater than or equal to the luminance value of the correction values; and performing color conversion based on the output viewing condition and the corrected luminance value of the monitor device characteristic.

8. A non-transitory computer-readable recording medium storing computer-executable instructions for causing a computer to perform the color processing method according to claim 7.

* * * * *